(12) United States Patent
Wan

(10) Patent No.: US 10,371,919 B2
(45) Date of Patent: Aug. 6, 2019

(54) LENS MODULE

(71) Applicant: Jia Wan, Shenzhen (CN)

(72) Inventor: Jia Wan, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 12 days.

(21) Appl. No.: 15/680,278

(22) Filed: Aug. 18, 2017

(65) Prior Publication Data
US 2018/0299638 A1 Oct. 18, 2018

(30) Foreign Application Priority Data
Apr. 15, 2017 (CN) .................... 2017 2 0398161 U

(51) Int. Cl.
G02B 7/02 (2006.01)
G02B 5/02 (2006.01)
G02B 27/00 (2006.01)
G02B 13/00 (2006.01)

(52) U.S. Cl.
CPC ............. *G02B 7/026* (2013.01); *G02B 5/021* (2013.01); *G02B 7/021* (2013.01); *G02B 27/0018* (2013.01); *G02B 13/004* (2013.01)

(58) Field of Classification Search
CPC ....... G02B 7/026; G02B 13/004; G02B 7/021
See application file for complete search history.

*Primary Examiner* — Jack Dinh
(74) *Attorney, Agent, or Firm* — Na Xu; IPro, PLLC

(57) ABSTRACT

The present disclosure provides a lens module. The lens module includes a lens barrel; a lens group accommodated in the lens barrel, the lens group including at least a first lens; and a retaining member located an image side of the lens group. The retaining member is a hollow ring which includes an object side leaning and connecting to the first lens, an image side opposite to the object side, an outer side and an inner side connecting to the object side and the image side, and the inner side is a Lambertian surface through Lambertian treatment.

8 Claims, 3 Drawing Sheets

LENS MODULE

FIELD OF THE PRESENT DISCLOSURE

The present disclosure relates to optical imaging technology, especially for a lens module used for various electronic equipment.

DESCRIPTION OF RELATED ART

Recent years, with a development of imaging technology and an emerging of an electronic product with an imaging function, an optical imaging lens has been extensively applied in various products, and improved and optimized constantly. Currently, a direction of improving most of imaging lenses is how to make the imaging lens smaller and thinner, and choose a proper lens with a good degree of adaptability of optical characteristics while making the imaging lens smaller and thinner, and study how to integrate them together to guarantee a good imaging result. However, during current imaging, there is always unnecessary stray light entering into the lens that impacts the imaging quality, therefore, during manufacturing the lens, it is required to check the lens and remove the unnecessary stray light, and it is difficult to judge the path of the stray light in the lens module currently, therefore, the imaging quality of the lens is worse, and finding out the unnecessary stray light during imaging is a technical problem that needs to be solved urgently.

Therefore it is necessary to provide a lens module for overcoming the above-mentioned disadvantages.

BRIEF DESCRIPTION OF THE DRAWINGS

Many aspects of the exemplary embodiments can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Figure 1:
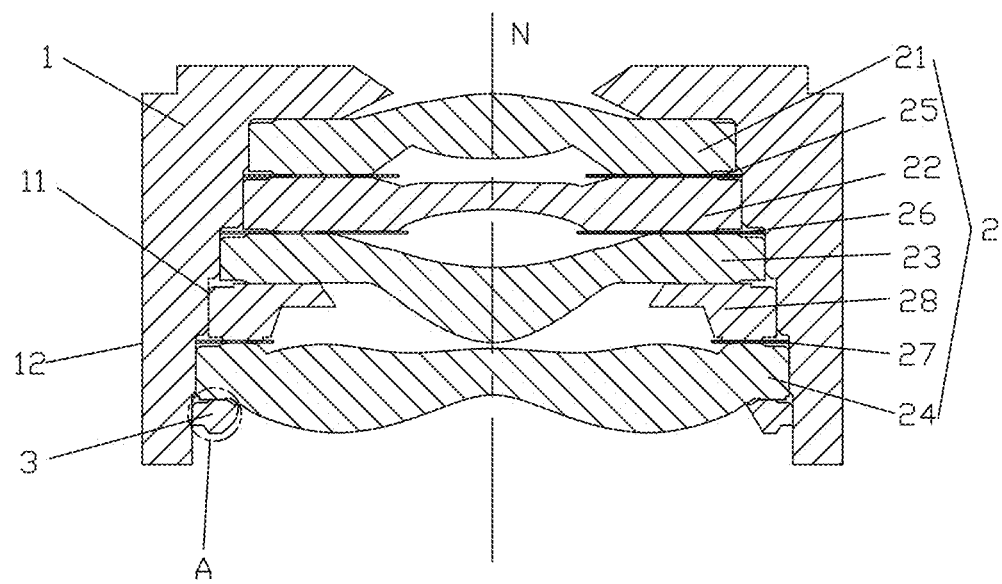
FIG. 1 is an illustrative cross-sectional view of a lens module including a retaining member in accordance with an exemplary embodiment of the present disclosure.
Figure 2:
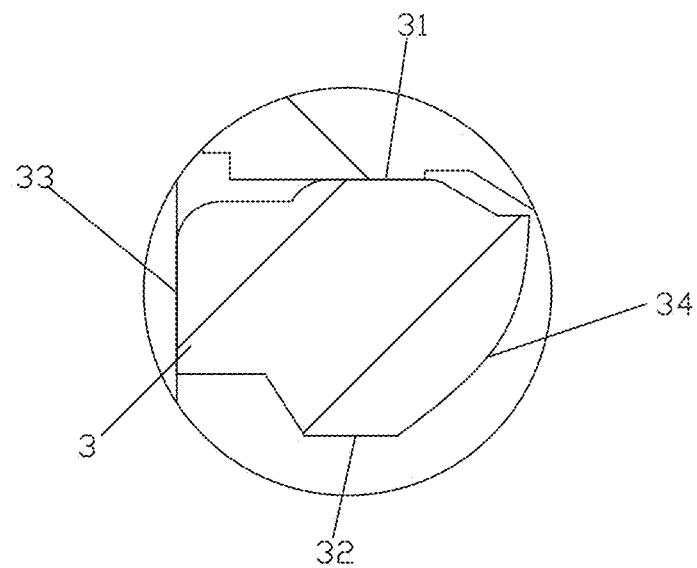
FIG. 2 is an enlarged view of Part A in FIG. 1.

A first embodiment of the present disclosure relates to a lens module. As shown in FIGS. 1-2, the lens module includes a lens barrel 1, a lens group 2 accommodated in the lens barrel 1 and a retaining member 3 set by an image side of the lens group 2. In which, there are four pieces of lenses totally included in the lens group 2 disclosed by the present embodiment: a first lens 24, a third lens 23, a fourth lens 22 and a fifth lens 21, and there are a first shading piece 27 and a shading board 28 between the first lens 24 and the third lens 23, and there is a second shading piece 26 between the third lens 23 and the fourth lens 22, and there is a third shading piece 25 between the fourth lens 22 and the fifth lens 21.

Various lenses are all arranged along an optical axis N, and the amount of the lens in a lens group 2 can certainly increase and decrease by actual imaging requirement. A retaining member 3 is a hollow ring which includes an object side 31, an image side 32 and an outer side 33 and an inner side 34 connecting the object side 31 and the image side 32, and a lens barrel includes an inner wall 11 and an outer wall 12, and the inner wall 11 and the outer wall 12 are set oppositely. The object side 31 is leaned and connected to the lens 24, and the image side 32 and the object side 31 are set oppositely, and the outer side 33 is leaned and connected to the inner wall 11 of a lens barrel 1, and the inner side 34 and the outer side 33 are set oppositely, and the inner side 34 is a Lambertian surface facing towards an optical axis N through Lambertian processing, including but not limited to the Lambertian processing of the inner side 34, in order to make it become a Lambertian body.

Through above content, it is not difficult to find out that, after completing the Lambertian processing to an inner side 34 of a retaining member 3 facing towards an optical axis N, after the incident light enters, it can diffuse the reflection light irregularly, in order to reduce the energy of the reflection light, and decrease the interference to an optical system by the reflection light, and improve a ghost image and sparkle and improve the imaging quality of the whole lens module.

Specifically, as shown in FIG. 2, the inner side 34 is an arc, which is to increase an area of the inner side 34, after the incident light enters, it can diffuse the reflection light irregularly, in order to reduce the energy of the reflection light, and decrease the interference to an optical system by the reflection light, and improve a ghost image and sparkle and improve the imaging quality of the whole lens module.

Besides, as shown in FIG. 2, the inner side 34 is an arc projecting towards a direction of an optical axis N. When the incident light enters, it can diffuse the reflection light irregularly, in order to reduce the energy of the reflection light, and decrease the interference to an optical system by the reflection light, and improve a ghost image and sparkle and improve the imaging quality of the whole lens module.

Besides, as shown in FIGS. 1-2, a vertical distance from one end of the inner side 34 near an object side 31 to the optical axis N is less than a vertical distance from one end of an the inner side 34 near an object side 32 to the optical axis N. The object side 31 is leaned to a lens group 2, and a width of an object side 31 is more than the width of the image side 32, in order to make a retaining member 3 retain a lens group 2 in a lens barrel 1 stably.

In addition, like the inner side 34 of the retaining member 3, complete Lambertian processing to the object side 31, the image side 32 and the outer side 33 of the retaining member and make them become Lambertian surfaces, in order to decrease the interference to an optical system by the reflection light, and improve a ghost image and sparkle and improve the imaging quality of the whole lens module.

Figure 3:
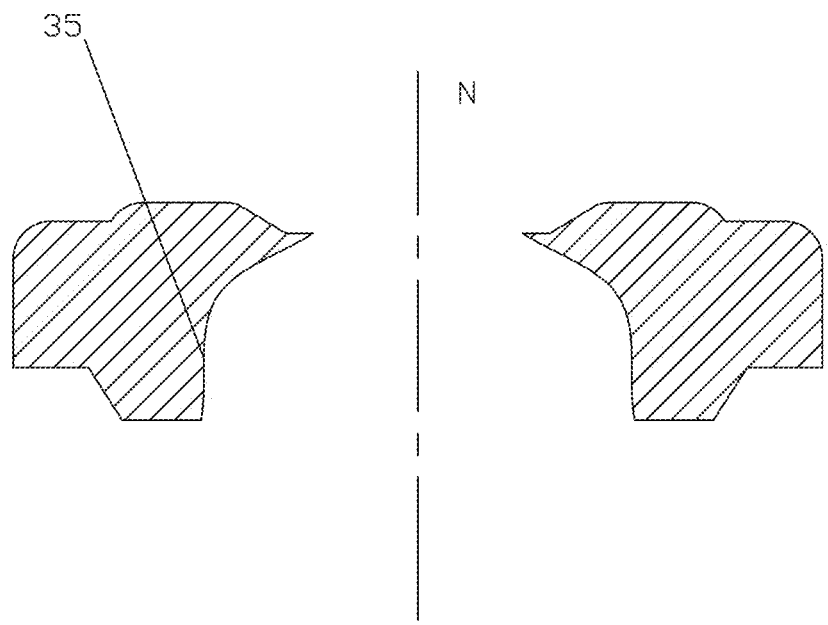
FIG. 3 is an illustration of a retaining member in another embodiment.

A second embodiment of this disclosure relates to a kind of lens module. The second embodiment is roughly the same as the first embodiment, the key difference lies in that: in a first embodiment, an inner side 34 is an arc projecting towards a direction of an optical axis N. However, in this embodiment, as shown in FIG. 3, the inner side 35 is an arc away from the direction of the optical axis N. When the incident light enters, it can diffuse the reflection light irregularly, in order to reduce the energy of the reflection light, and decrease the interference to an optical system by the reflection light, and improve a ghost image and sparkle and improve the imaging quality of the whole lens module.

Figure 4:
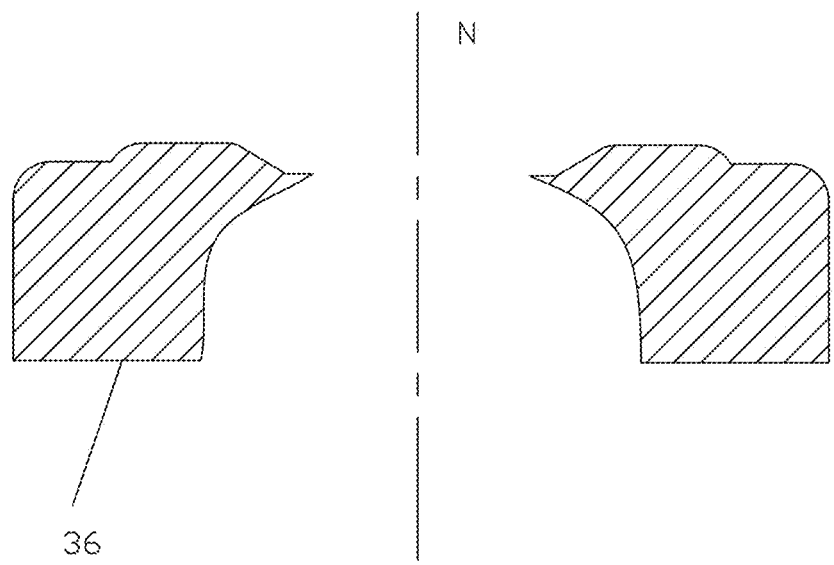
FIG. 4 is an illustration of a retaining member in another embodiment.

A third embodiment of this disclosure relates to a kind of lens module. The third embodiment is roughly the same as a second embodiment, and the key difference lies in that: in this embodiment, as shown in FIG. 4, an image side 36 is a plane, and its structure is simpler, and it is more convenient for production and manufacture.

Figure 5:
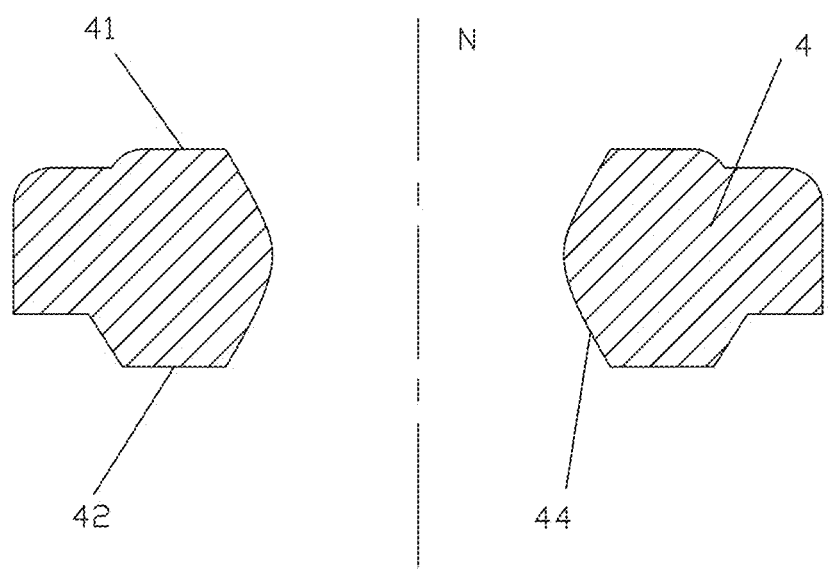
FIG. 5 is an illustration of a retaining member in another embodiment.

A fourth embodiment of this disclosure relates to a kind of lens module. The second embodiment is roughly the same as the first embodiment, the key difference lies in that: in the first embodiment, a vertical distance from one end of an inner side 34 near an object side 31 to an optical axis N is less than a vertical distance from one end of an the inner side 34 near an object side 32 to the optical axis N. However, in this embodiment, as shown in FIG. 5, the vertical distance from one end of the inner side 44 of a retaining member 4 near the object side 41 to the optical axis N is equal to the vertical distance from one end of the inner side 44 near an object side 42 to the optical axis N.

In other embodiment, a lens module can also be further set in at least one second lens by an object side of the first lens in the lens barrel, and the second lens is arranged with the first lens along an optical axis.

In other embodiment, as actually required, the amount of the lens included in the lens group can be any number more than or equal to 1, and a fixing component can also be any number more than or equal to 1, and above bonding structure can be used for bonding and fixing between other fixing components and a lens barrel or by other method.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A lens module including:
a lens barrel;
a lens group accommodated in the lens barrel, the lens group including at least a first lens;
a retaining member located an image side of the lens group; wherein
the retaining member is a hollow ring which includes an object side leaning and connecting to the first lens, an image side opposite to the object side, an outer side and an inner side connecting to the object side and the image side, and the inner side is a Lambertian surface through Lambertian treatment.

2. The lens module as described in claim 1 wherein the inner side is an arc.

3. The lens module as described in claim 2 wherein the inner side is an arc projecting along an optical axis of the lens module.

4. The lens module as described in claim 2 wherein the inner side is an arc depressing along an optical axis.

5. The lens module as described in claim 3 wherein a vertical distance between one end of the inner side near an object side and an optical axis is less than or equal to a vertical distance between one end of the inner side near an image side and an optical axis.

6. The lens module as described in claim 5 wherein the image side is a plane.

7. The lens module as described in claim 6 wherein the object side, the image side and the outer side are Lambertian surfaces through Lambertian processing.

8. The lens module as described in claim 6 further including a second lens in the lens barrel by the object side of the first lens, and the second lens and the first lens are arranged along an optical axis.

* * * * *